United States Patent [19]
Bishaf

[11] 3,875,801
[45] Apr. 8, 1975

[54] SCUBA DIVER'S TIME REMAINING GAUGE

[76] Inventor: Phillip C. Bishaf, 2300 N. Commonwealth, Chicago, Ill. 60614

[22] Filed: Aug. 27, 1973

[21] Appl. No.: 391,818

[52] U.S. Cl............ 73/389; 128/142.2; 235/92 MT
[51] Int. Cl............................................. G01l 19/00
[58] Field of Search.......... 73/389, 388 R, 291, 300, 73/432 CR; 235/92 MT, 92 T, 151.3; 128/142.2, 142.4

[56] References Cited
UNITED STATES PATENTS

| | | | |
|---|---|---|---|
| 2,565,526 | 8/1951 | Seitz................................ | 73/388 R |
| 2,614,422 | 10/1952 | Payne .............................. | 73/291 X |
| 3,670,575 | 6/1972 | Emerick........................... | 73/388 R |
| 3,715,927 | 2/1973 | Grant................................ | 73/389 |

Primary Examiner—S. Clement Swisher
Assistant Examiner—Joseph W. Roskos

[57] ABSTRACT

A sensing and indicating device for automatically indicating the time to depletion of a gas in any size pressure tank, comprising a sensor circuit continuously responsive to the instantaneous pressure in the tank, and the rate of depletion of gas in said tank, for developing signals indicative of the instantaneous pressure and a differentiator circuit for receiving the pressure signals and, in turn, for developing signals proportional to the rate of change of said instantaneous pressure. A divider circuit compares the pressure signals and rate of change signals, and develops signals proportional to the time remaining before depletion of the gas supply in said tank feeding the same into a receiving indicator connected to said divider circuit for continuously indicating the time to depletion of the gas supply in said tank.

12 Claims, 1 Drawing Figure

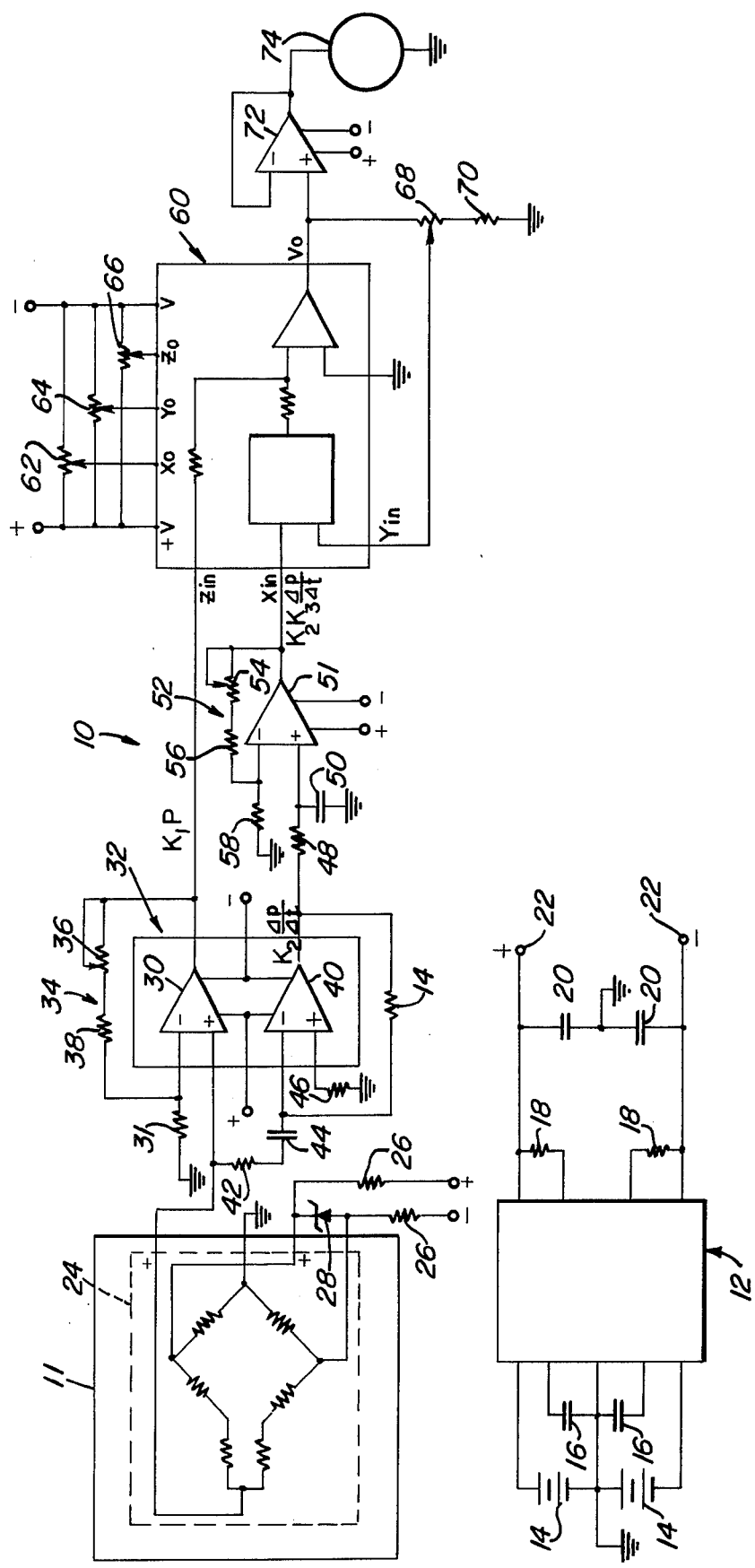

SCUBA DIVER'S TIME REMAINING GAUGE

BACKGROUND OF THE INVENTION

1. Field of the Invention

The present invention generally relates to the field of pressure measuring devices. In particular, the invention pertains to measurement of the rate of depletion of a gas in a tank, which gas is being depleted at a variable rate. Furthermore, the invention is associated with pressure measuring devices which display the amount of gas remaining in the tank from which gas is being withdrawn. The amount of gas remaining is displayed in terms of the amount of time remaining until depletion. While the preferred embodiment of the present invention relates to a device for measuring and displaying the amount of time remaining in a SCUBA (self contained underwater breathing apparatus) diver's compressed air tank, the invention can be used to determine the amount of time remaining until depletion in any tank containing gas under pressure where the depletion rate of the gas may be highly fluctuating.

2. Prior Art

The invention is described as being used in the SCUBA diving environment but is not restricted to that use.

Previously a SCUBA diver could read only the pressure in his or her air supply tank and estimate how long it would last under variable conditions of diving depth and physical activity. The rate of use of the air in the tanks is varied by both of these conditions, and the rate of use determines the time the air supply in the tanks will last. This time is of critical importance because a diver's ascent time is directly proportional to the depth of the water from which he started his ascent. Thus, it is most important to a SCUBA diver to know accurately the time his air supply will last, that is the time until the pressure in his air tank will fall to the minimum allowable safe limit.

A pressure tank is based upon Boyle's law, which is the principle that the volume of a gas varies inversely as the absolute pressure while the density varies directly as the absolute pressure, provided the temperature is constant. Thus, at a given temperature, the product of pressure and volume for a gas is constant: $PV=K$. In SCUBA diving the temperature of the water is relatively constant and P is the pressure inside the tank while V is the volume of the tank. Thus, at varying water depths where greater or less pressure is required to expand the lungs to their full volume, the depletion of air in the tank will occur at varying rates. This fact plus the fact that each diver consumes his or her air supply at different rates makes mental calculations of time remaining an educated guess at best so that the diver is never exactly sure of the time remaining.

This problem is the field of time-remaining tank gauges was partially solved by U.S. Pat. No. 3,670,575. This patent discloses an expensive, complex electromechanical device which is used for measuring the time remaining. In the patent art, two differential pressure transducers are required: one to measure the present pressure of the gas tank minus the ambient pressure, the other to measure the pressure of a reservoir which is indicative of the tank pressure at an earlier point in time minus the present tank pressure. The time lapse between the two tank pressure measurements is determined by an external clock. Logarithmic potentiometers are used to provide electrical signals proportional to the logarithms of the two pressure differentials. These signals are then used to mechanically divide the present pressure by the change in pressure during the clock period, thus giving an indication of time remaining until depletion of the gas in the tank. Such electromechanical devices may be 10 to 20 percent inaccurate on a full scale basis.

Another U.S. Pat. No. 3,715,927 discloses a less sophisticated approach of determining the time remaining in a scuba diver's tank.

The present invention eliminates the complex mechanical components needed by the prior art and provides a simplified pressure measuring device which is easy to manufacture, and economical to maintain. When the invention is attached to the high pressure port of a conventional scuba diver's pressure regulator which in turn is connected to an air tank, the diver will be able to read a gauge that will tell him exactly how much time he has left before his air runs out, assuming that future consumption is at the same rate as the instantaneously measured rate. In the invention the gauge not only takes into account the depth at which the diver is diving but also the rate at which he is breathing, by monitoring a single parameter. For example, if a diver descends to 33 feet, his tank will last only half as long as on the surface. This device will automatically reflect this change in diving depth. The same results in reverse would occur if the diver ascended 33 feet to the surface. Additionally, variations in consumption rate due to the diver's physical activity will be accounted for. The completely electronic construction of the invention allows a high degree of accuracy.

SUMMARY OF THE INVENTION

The present invention comprises a device for measuring the time remaining of a supply of a gas contained in a tank based upon the rate of pressure change, where the rate of change of pressure is determined instantaneously.

The above mentioned purposes are more readily apparent when read in conjunction with the following detailed description of a preferred embodiment of the present invention.

BRIEF DESCRIPTION OF THE DRAWINGS

The FIGURE discloses a schematic drawing of the circuitry of the invention.

DETAILED DESCRIPTION OF THE INVENTION

In the pressure measuring device 10 as shown by the drawing, a stable power supply voltage is developed by a conventional voltage regulator 12 which derives its electrical power from batteries 14. The batteries 14 are envisioned as being optionally equipped with a battery test circuit and self checking circuit for safety purposes. The voltage regulator 12 is internally compensated by means of capacitors 16 and its output current is limited by resistors 18 with capacitors 20 insuring a smooth +15 volt D. C. output at one of the terminals 22 and a smooth −15 volt D.C. output at the other terminal 22.

The pressure transducer 24 can be constructed of piezoelectric material or other suitable material, and is supplied with power from the voltage regulator 12 and terminals 22 through resistors 26 and Zener diode 28 which provides a constant excitation voltage for the pressure transducer. The pressure transducer 24 is sensitive to the pressure of the gas contained within the tank 11 as schematically shown.

The output pressure signal of the transducer 24 is applied to the non-inverting input of a linear operational amplifier 30 on an integrated circuit chip 32, and is amplified to a suitable voltage $K_1P$, where $K_1$ is a constant, determined by values of the gain adjusting feedback resistance 36, and P is the pressure measured by the transducer 24. The inverting terminal of amplifier 30 is connected to ground through resistor 31. Amplifier 30 employs a feedback circuit 34 containing variable resistor 36 and which allows for stable operation and gain adjustment.

Contained on the same integrated circuit chip 32 is amplifier 40 which is connected at its inverting terminal to the output of pressure transducer 24 by means of resistor 42 and capacitor 44. The non-inverting input is connected to ground through resistor 46. Resistors 42 and 14 and capacitor 44 are chosen so as to make the amplifier-R-C circuit combination act as a signal differentiator to determine changes in the sensed pressure, $K_2 \Delta P/\Delta t$, where $K_2$ is a constant determined by circuit parameters, $\Delta P$ is the change in pressure and $\Delta t$ is the corresponding change in time, this output signal then being smoothed by the R-C combination of resistor 48 and capacitor 50.

Further amplification and control of this smoothed signal is then provided by amplifier 51 including feedback loop 52 which consists of variable resistor 54 and resistor 46 providing gain control. The inverting terminal of operational amplifier 51 is connected as previously described by way of resistor 58 to ground. The output signal of amplifier 51, $K_3K_2\Delta P/\Delta t$, where $K_3$ is the gain, is adapted to drive multiplier/divider module 60.

Multiplier/divider module 60, which is a commercially available device such as Analog Devices No. AD530K, is connected in the dividing mode. In this mode its output is given by $Vo = K_4 \text{ Zin/Xin}$, $K_4$ being determined by internal circuit parameters. The output from amplifier 51, $K_2K_3\Delta P/\Delta t$, is fed to the Xin terminal of module 60 and the output from amplifier 30, $K_1P$, is fed into the Zin terminal. The output from the divider module 60 is thus given by $K\ P/\Delta P/(\Delta t)$, where $K = K_1K_4/K_2K_3$. Resistors 62, 64, and 66 are used for initial trimming of the module 60 while resistor 68 controls the gain and is connected to ground through resistor 70. The output signal from the module 60 is applied to amplifier 72, which is connected as a voltage follower, to drive voltmeter or gauge 74 which is calibrated in a time scale to display the amount of gas in the tank in terms of time remaining. The circuit is alternately envisioned as being equipped with an analog/digital converter which would allow a digital readout rather than a meter.

While the preferred embodiment of the invention has been disclosed, it is understood that the invention is not limited to such an embodiment since it may be otherwise embodied in the scope of the appended claims.

What is claimed is:

1. A sensing and indicating device for automatically indicating the time to depletion of a gas in a pressure tank, the device comprising: sensor means comprising a transducer continuously responsive to the instantaneous pressure and the rate of depletion of gas in said tank, for developing electrical signals indicative of said instantaneous pressure; an integrated circuit chip electrically connected to said transducer, said circuit chip comprising differentiator means for receiving said pressure signals and, in turn, for continuously developing signals proportional to the rate of change of said instantaneous pressure; electronic divider means for continuously comparing said pressure signals and said rate of change signals, and for developing signals proportional to the time remaining before depletion of the gas supply in said tank; and receiving means connected to said divider means for continuously indicating the time to depletion of the gas supply in said tank.

2. The device as claimed in claim 1 including battery means for electrically biasing said sensor means.

3. The device as claimed in claim 1 wherein said sensing means comprises a pressure transducer, and wherein said differentiator means comprises an R-C circuit in series with an integrated circuit operational amplifier deriving its input from said transducer.

4. The device as described in claim 1 wherein said divider means electronically divides a signal proportional to the instantaneous pressure in said tank by a signal proportional to the rate of change of said instantaneous pressure.

5. The device as claimed in claim 3 wherein said integrated circuit comprises dual matched operational amplifiers.

6. The device as claimed in claim 1 and further comprising a voltage follower amplifier receiving its input from said divider means and delivering its output to said receiving means; and wherein said receiving means is a gauge calibrated in a time scale.

7. The device as claimed in claim 6 wherein said gauge is a voltmeter.

8. The device as claimed in claim 6 wherein said gauge has digital readout.

9. The device for electronically indicating the time to depletion of a gas supply in a pressure tank, comprising: pressure sensing means sensitive to instantaneous internal tank pressures for issuing first electrical signals indicative of such pressures; first operational amplifier means for receiving said first electrical signals and for issuing second amplified signals proportional to said first signals; second operational amplifier means for receiving said first electrical signals and for issuing third electrical signals proportional to the rate of change of said first electrical signals; third operational amplifier means for receiving said third electrical signals and for issuing fourth amplified signals proportional to said third electrical signals; and divider means adapted to receive and divide said second electrical signals by said fourth electrical signals, and for issuing fifth electrical signals proportional to such quotient; and sensing and display means for receiving said fifth electrical signals and for issuing a visual indication proportional to the strength thereof, and displaying the time remaining before the depletion of the gas supply in said tank.

10. The device recited in claim 9 wherein the first operational amplifier is connected in its non-inverting mode and said second operational amplifier is connected in its inverting mode.

11. The device recited in claim 10 and further comprising a voltage follower amplifier interposed in series between said divider means and said sensing and display means.

12. The device for electronically indicating the time to depletion of a gas supply in a pressure tank, comprising: pressure sensing means sensitive to instantaneous internal tank pressures for issuing first electrical signals indicative of such pressures; first operational amplifier means for receiving said first electrical signals and for issuing second amplified signals proportional to said first signals; second operational amplifier means for receiving said first electrical signals and for issuing third electrical signals proportional to the rate of change of said first electrical signals; third operational amplifier means for receiving said third electrical signals and for issuing fourth amplifed signals proportional to said third electrical signals, and divider means adapted to receive and divide said second electrical signals by said fourth electrical signals; and for issuing fifth electrical signals digitally equivalent to such quotient; and sensing and display means for receiving said fifth electrical signals and for issuing a visual indication digitally equivalent to the strength thereof to display the time remaining before the depletion of the gas supply in said tank.

* * * * *